ёеё

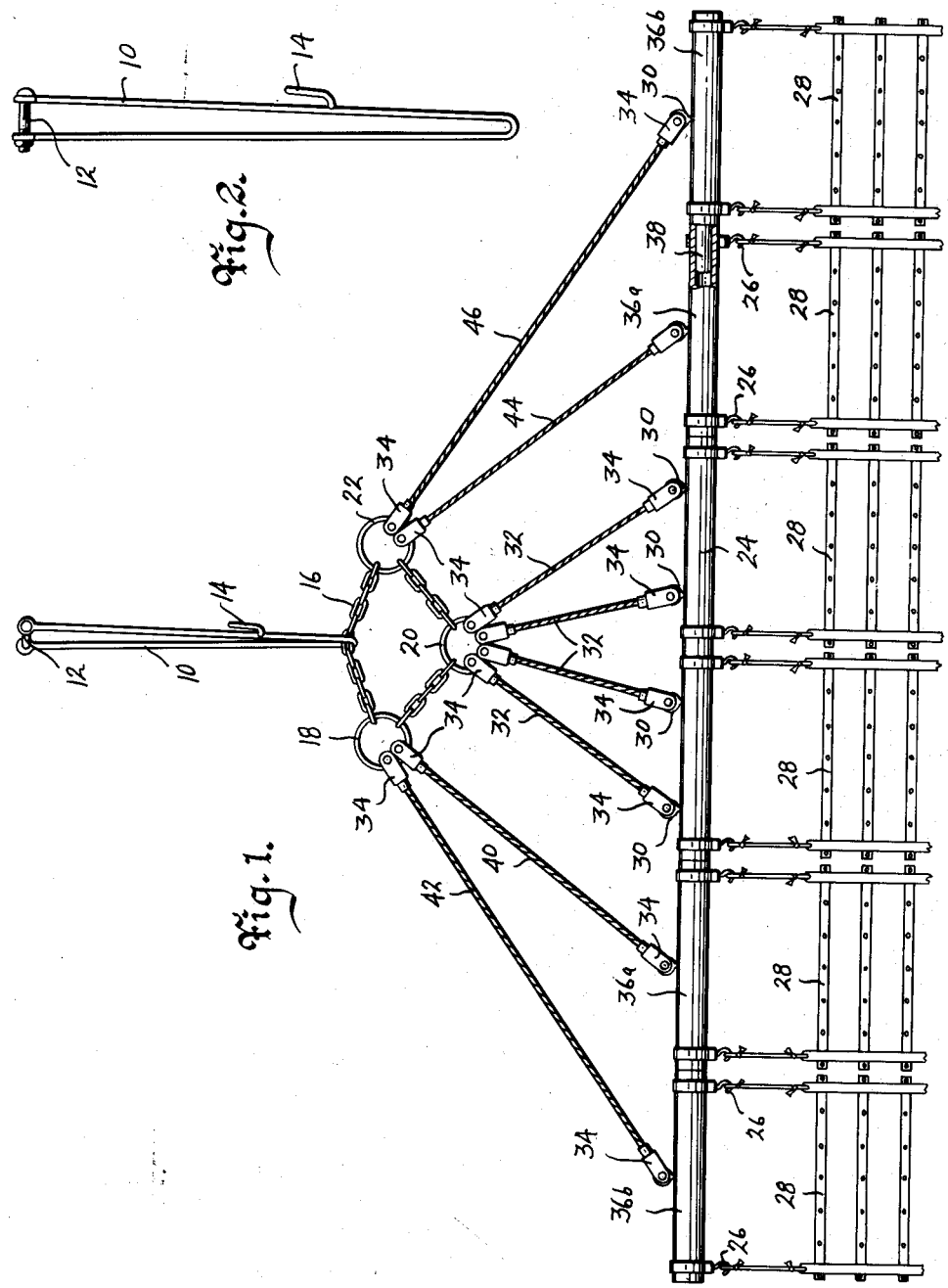

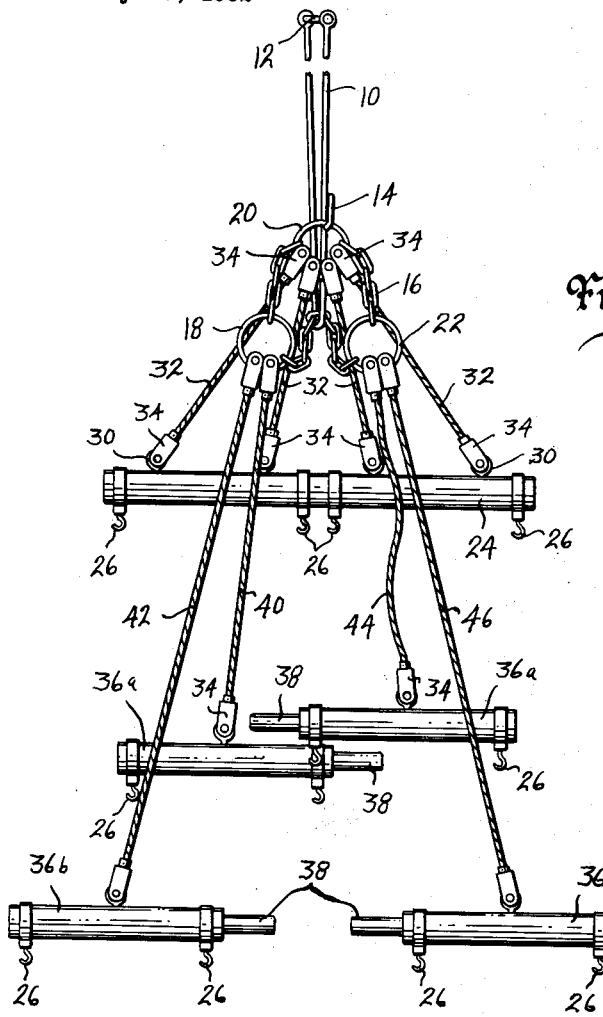
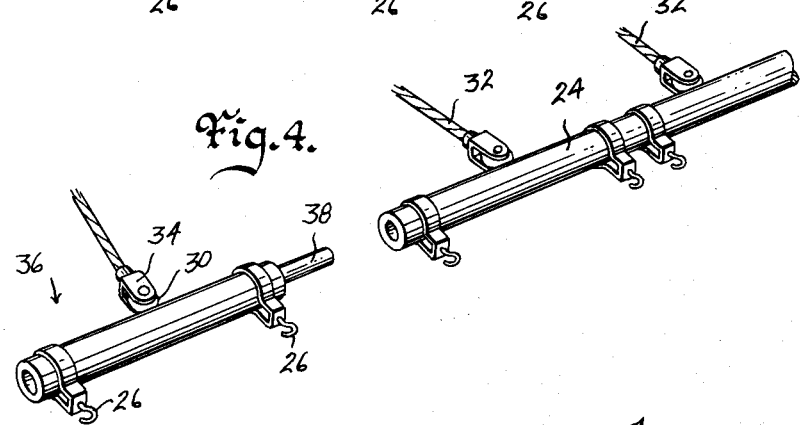

United States Patent Office 2,717,480
Patented Sept. 13, 1955

2,717,480

HARROW DRAWBAR

John A. Schulte, Sac City, Iowa

Application May 16, 1952, Serial No. 288,203

8 Claims. (Cl. 55—84)

My invention relates to improvements in harrow drawbars.

Harrow drawbars must of necessity be moved through restricted passageways such as a gate at times and to make this possible some drawbars embody the use of hinged end portions that usually fold to the vertical, while others use a center drawbar section having removable endwise extension units that can be detached therefrom and placed in tandemwise relationship when negotiating the narrow confines of the gate. It is with this latter type of drawbar that my invention is more particularly concerned and in connection therewith it has been the practice in the past to detach the extensions and manually place them in tandem relationship to the drawbar. If more than one extension unit is arranged on the same side of the center section it is similarly placed relative to the center section and first extension unit. This tandemwise arrangement is possible since the center section and all extension units have cable members extending therefrom respectively to a common coupling assembly and obviously in such an arrangement the cables on the respective extension units will be progressively longer depending upon the number of such units applied to any one side of the center section. These cables must be substantially free of slack when the center sections and extensions are in operating position to provide an equalized draft and since each section of the drawbar will have harrow sections attached thereto, it has been found from experience that when the extension units adjacent the respective end of the center section are placed in tandem relationship thereto, the spaced relationship then existing between the respective extensions and the center section afforded by the length of cable on the extension is not adequate to allow movement of the entire assembly without the extension units overlapping on and crowding the harrow sections attached to the center section. Generally, this problem does not exist relative to the distance between a second extension unit and the first because of the added cable length normally necessary for the second unit.

It is therefore an object of my invention to provide a harrow drawbar that is lengthwise adjustable by stub extension units and capable of having such units arranged in tandemwise relationship for passage through a restricted area such as a gate or the like in such a manner that the drawbar or harrow sections attached thereto are not overlapped by the tandem arranged extension unit or units.

More particularly it is an object of my invention to provide a harrow drawbar of the above class in which the extension units and drawbar are connected by flexible members to a common coupling assembly and wherein the normal operating distance between the drawbar and the coupling means can be materially reduced by a novel coupling assembly so that there is no overlapping of the drawbar and its attached harrow sections with any extension unit arranged in tandemwise relationship thereto.

Another object of this invention is to provide a harrow drawbar or evener comprising a center section longitudinally extensible by detachable stub sections that is capable of having the stub sections arranged in tandemwise relation for passage through a gate when the drawbar is attached to a tractor and wherein after the stub sections are manually detached from the center section, the power of the tractor is utilized to create the tandemwise alignment.

Still another object of my invention is to provide a draft equalizer having the above mentioned characteristics in which when changing the tandemwise relationship back to operating position the power of the tractor is utilized to reduce the tandem spaced relationship so that a minimum of manual handling is required in attaching the stub section to the center section.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is an elevational view of a six harrow section drawbar showing a preferred embodiment of my invention in the coupling assembly, Fig. 2 is an enlarged elevational view of the tandem hitch clevis used with my invention, Fig. 3 is an elevational view of a harrow evener with the respective stub extension units arranged in tandemwise relationship and illustrating the use of my coupling assembly therein, and Fig. 4 is an enlarged perspective view of a stub section and portion of the center drawbar section to illustrate their means of attachment.

Referring to the drawings I have used the numeral 10 to designate an elongated tandem hitch clevis provided with the bolt 12. A hook member 14 is secured to the clevis as illustrated in Fig. 2 so that the free end thereof extends towards the clevis bolt 12. The bolt end of this clevis will be attached to a tractor hitch or the like (not shown) and the closed end will connect to the chain coupling assembly which consists of the endless chain member 16 with three spaced apart rings 18, 20 and 22, and ring 20 will be referred to as the tandem ring for purposes of identification. Obviously the chain 16 may consist of three segments joined together by the rings as illustrated but in effect it is an endless chain assembly as illustrated in Fig. 1.

An elongated tubular drawbar (Fig. 3) 24 constitutes what I shall refer to as the center section or center tubing and is provided with a plurality of spaced apart hooks 26 adapted to be used in pairs for attachment to harrow sections 28 as shown in Fig. 1. Also on the center tubing I provide a plurality of equally spaced eye hooks 30 and each of these hooks 30 is connected by a separate flexible member such as a cable 32 to the tandem ring 20. For this purpose each cable 32 has a clevis member 34 on each end. To extend the center section for accommodating a greater number of harrow sections I use stub tubing sections shown generally at 36 in Fig. 4. Each stub section has the stub shaft member 38 on one end for telescoping into one end of the center tubing or into one end of another stub section if more than one set of such sections is added to the center tubing and each stub section carries hooks and eye hooks having like numbers as like elements on the center tubing. It will be observed, however, that the eye hooks 30 on the stub sections are centrally located relative to the longitudinal extremities thereof of excluding the shaft portion 38.

With reference to Figs. 1 and 3 it will be observed that

I have illustrated the use of two stub sections added to each end of the center tubing and for purposes of clarity I shall refer to those stub sections adjoining the respective ends of the center tubing as the first stub tubings which are identified as 36–a and to the stub sections extended from the first stub tubings as the second stub tubings identified as 36–b. With reference now to Fig. 1 it will be observed the first and second stub tubings to the left of the center section are connected by cables 40 and 42 respectively to ring 18. Likewise the first and second stub tubings to the right of the center section are connected by cables 44 and 46 respectively to ring 22 and in this arrangement cables 40 and 44 are of equal length and longer than cable 30 and cables 42 and 46 are equal in length and longer than cables 40 and 44. The chain 16 is engaged between rings 18 and 22 in the hook 14 and when this assembly as shown in Fig. 1 is being pulled by a tractor there will be no slack in the several cables so that the draft is equalized.

In negotiating a restricted passageway such as a gate it is obvious that the extended drawbar shown in Fig. 1 must be reduced in length and one manner of doing this is to detach the respective stub tubings and arrange them in tandem. This has generally been accomplished manually and because of the relatively small increase in length between the cables on the first stub tubings and the center section there has been an overlapping contact between these first stub tubings and the harrow sections on the center tubings so that the two become easily inter-tangled. However, in my invention I have reduced to a minimum the amount of manual handling required both in forming the tandem arrangement and in returning the stub tubing to alignment with the center section and I have also eliminated the overlapping of parts when in tandem. To accomplish this, my drawbar is manipulated as follows. With the arrangement in Fig. 1, the tractor is backed sufficiently to provide slack in all cables. The second stub tubings are then manually withdrawn from engagement with the first and likewise the first stub tubings are disengaged from the center section. Ring 20, or the tandem ring as I prefer to call it, is then looped over hook member 14 as shown in Fig. 3. This latter operation obviously shortens the distance between the tandem ring and the clevis 12 relative to its normal operating position. At this point the tractor is driven forward which causes the sections 36–a and 36–b to fall into tandem position as shown in Fig. 3 and it will be observed that the effect of placing the tandem ring on hook 14 provides ample space between the first stub tubings and the center section. Once through the gate the ring 20 can be disengaged from hook 14 and as the tractor is driven forward the tandem ring and cables 32 will return to position illustrated in Fig. 1. At the same time the sections 36–a and 36–b will to a certain extent be moved closer to the center section so that there remains less distance for them to be manually moved for alignment with the center tubing as would normally be the case without my invention.

Some changes may be made in the construction and arrangement of my harrow drawbar without departing from the real spirit and purpose of my invention, and it is my intention to cover by my claims, any modified forms of structure or use of mechanical equivalents which may be reasonably included within their scope.

I claim:

1. In a harrow drawbar, a clevis hitch member, a hook on said clevis member intermediate its open and closed ends, a first chain member engaged by the closed end of the clevis member, first and third ring members respectively disposed on said first chain at either end, a second ring member connected by chains to the first and third ring members, a lengthwise adjustable drawbar formed of a series of endwise aligned detachably connected sections having at least a center section with a stub section at each side thereof, a plurality of flexible pull members connecting the center section to said second ring member, a flexible pull member connecting the stub section at one side of the center section to said first ring member and a like pull member connecting the stub section at the other side of the center section to said third ring member, said stub sections capable of being detached from the center section and arranged in tandemwise relationship thereto, and said second ring member capable of being detachably arranged on said hook member so that in the tandem arrangement the spaced relationship between the center section and the clevis hitch member is reduced to correspondingly increase the tandem spaced relationship between the stub sections and the center section.

2. In a harrow drawbar, a clevis hitch member, a hook on said clevis member, a first chain member engaged by the closed end of the clevis member, first and third ring members respectively disposed on said first chain at either end, a second ring member connected by chains to the first and third ring members, said first chain member engaged by said clevis member between said first and third ring members at a point oppositely disposed and normally spaced from said second ring member, a lengthwise adjustable drawbar formed of a series of endwise aligned detachably connected sections having at least a center section with a stub section at each side thereof, a plurality of flexible pull members connecting the center section to said second ring member, a flexible pull member connecting the stub section at one side of the center section to said first ring member and a like pull member connecting the stub section at the other side of the center section to said third ring member, said stub sections capable of being detached from the center section and arranged in tandemwise relationship thereto, and said second ring member capable of being detachably arranged on said hook member so that in the tandem arrangement the normal spaced relationship between the center section and the clevis hitch member is reduced to correspondingly increase the tandem spaced relationship between the stub sections and the center section.

3. In a harrow drawbar, a clevis hitch member, a hook on said clevis member, a first chain member engaged by the closed end of the clevis member, first and third ring members respectively disposed on said first chain at either end, a second ring member connected by chains to the first and third ring members, said first chain member engaged by said clevis member between said first and third ring members at a point oppositely disposed and normally spaced from said second ring member, a lengthwise adjustable drawbar formed of a series of endwise aligned detachably connected sections having at least a center section with a stub section at each side thereof, a plurality of flexible pull members connecting the center section to said second ring member, a flexible pull member connecting the stub section at one side of the center section to said first ring member and a like pull member connecting the stub section at the other side of the center section to said third ring member, said center section detachable from said stub sections and movable toward the clevis member out of endwise alignment with said stub section, said second ring member detachably engageable with said hook to hold the center section in its moved position, and said stub sections when detached from the center section capable of being moved into tandemwise relation thereto by the application of a forwardly pulling force to said clevis member.

4. In a harrow drawbar, a clevis hitch member, a hook on said clevis member, a ring-chain assembly composed of chains interconnected with rings, said ring-chain assembly engaged by said clevis member, a lengthwise adjustable drawbar formed of a series of endwise aligned detachably connected sections having at least a center section with a stub section at each side thereof, a plurality of flexible pull members connecting the center section to said ring-chain assembly at a common point, a flexible pull member connecting the stub section at one side of the center section to said ring-chain assembly at one side and spaced from the common connecting point thereon for said first mentioned flexible members and a like pull member connecting the stub section at the other side of the center section to said ring-chain assembly on the other side and spaced from the common connecting point thereon for said first mentioned flexible members, said stub sections capable of being detached from the center section and arranged in tandemwise relationship thereto, and said common connecting point on said ring-chain assembly for the first mentioned flexible members capable of being detachably arranged on said hook member so that in the tandem arrangement the spaced relationship between the center section and the clevis hitch member is reduced to correspondingly increase the tandem spaced relationship between the stub sections and the center section.

5. In a harrow drawbar, a hitch member, a ring-chain assembly composed of chains interconnected with rings, said ring-chain assembly engaged by said hitch member, a lengthwise adjustable drawbar formed of a series of endwise aligned detachably connected sections having at least a center section with a stub section at each side thereof, a plurality of flexible members connected at one end respectively at spaced intervals on said center section and having their other ends connected to said ring-chain assembly at a common point, a flexible member connecting one stub section to said ring-chain assembly at one side and spaced from the common connecting point thereon for the first mentioned flexible members, a like flexible member connecting the other stub section to the other side and spaced from said common connecting point, said center section detachable from said stub sections and movable toward the hitch member out of endwise alignment with said stub sections, means for holding said center section in its moved position, and said stub sections when detached from the center section capable of being moved into tandemwise relation thereto by the application of a forwardly pulling force to said hitch member.

6. In a harrow drawbar, a lengthwise adjustable drawbar formed of a center section and a set of outer stub sections extending from each end of the center section, coupling means on the inner end of each stub section for detachably connecting and supporting the same in endwise alignment with said center sections, a coupling means designed to be attached to a tractor or the like, hook means on said coupling means, a plurality of flexible pull members each connected at one end to said center section, a flexible pull member connected at one end to each stub section, a flexible coupling means connected to said first mentioned coupling means and having connected thereto the other ends of all of said flexible pull members, said stub sections capable of being detached from said center section and arranged in tandemwise relationship thereto, and said flexible coupling means engageable with said hook means to shorten the normal distance between said coupling means whereby the spaced relationship between said center section and said coupling means is reduced and an increased spaced relationship is provided between said stub sections and said center sections when arranged in tandem.

7. In a harrow drawbar, a lengthwise adjustable drawbar formed of a center section and a set of outer stub sections extending from each end of the center section, coupling means on the inner end of each stub section for detachably connecting and supporting the same in endwise alignment with said center section, an elongated coupling means designed to be attached to a tractor or the like, hook means on said coupling means intermediate its ends, a plurality of flexible pull members each connected at one end to said center section, a flexible pull member connected at one end to each stub section, a flexible coupling means connected to said first mentioned coupling means at its trailing end relative to its direction of movement and having connected thereto the other ends of all of said flexible pull members, said stub sections capable of being detached from said center section and arranged in tandemwise relationship thereto, and said flexible coupling means engageable with said hook means to shorten the normal distance between said coupling means whereby the spaced relationship between said center section and said coupling means is reduced and an increased spaced relationship is provided between said stub sections and said center sections when arranged in tandem.

8. In a harrow drawbar, a lengthwise adjustable drawbar formed of a center section and a set of outer stub sections extending from each end of the center section, coupling means on the inner end of each stub section for detachably connecting and supporting the same in endwise alignment with said center section, a coupling means in the form of an elongated clevis having its open end designed to be attached to a tractor or the like, hook means on said clevis intermediate its ends, a plurality of flexible pull members each connected at one end to said center section, a flexible pull member connected at one end to each stub section, a flexible coupling means connected to the closed end of said clevis and having connected thereto the other ends of all of said flexible pull members, said stub sections capable of being detached from said center section and arranged in tandemwise relationship thereto, and said flexible coupling means engageable with said hook means to shorten the normal distance between said coupling means whereby the spaced relationship between said center section and said coupling means is reduced and an increased spaced relationship is provided between said stub sections and said center sections when arranged in tandem.

References Cited in the file of this patent

UNITED STATES PATENTS

| | | |
|---|---|---|
| 1,722,540 | Rasmussen | July 30, 1929 |
| 2,131,667 | Noble | Sept. 27, 1938 |